United States Patent [19]

McCleer et al.

[11] Patent Number: 5,394,321

[45] Date of Patent: Feb. 28, 1995

[54] QUASI SQUARE-WAVE BACK-EMF PERMANENT MAGNET AC MACHINES WITH FIVE OR MORE PHASES

[75] Inventors: Patrick J. McCleer, Jackson, Mich.; J. Milton Bailey; Jack S. Lawler, both of Knoxville, Tenn.

[73] Assignee: Electric Power Research Institute, Inc., Palo Alto, Calif.

[21] Appl. No.: 939,123

[22] Filed: Sep. 2, 1992

[51] Int. Cl.⁶ .......................................... H02M 7/5387
[52] U.S. Cl. ..................... 363/131; 363/132; 318/811; 310/180
[58] Field of Search ............... 310/156, 179, 180, 184, 310/49 R, 162; 318/711, 720, 724, 811; 363/131, 132

[56] References Cited

PUBLICATIONS

McCleer et al., "Five-Phase Trapezoidal Back EMF PM Synchronous Machines and Drives," 1991, which was presented at the European Power Conference, Florence, Italy, Sep. 3, 1991.

*Primary Examiner*—Emanuel T. Voeltz
*Attorney, Agent, or Firm*—Leonard Bloom

[57] ABSTRACT

A new class of higher phase-order (five or more) quasi square-wave back emf permanent magnet machines including radial, axial and linear embodiments which employ a greater number of active phase windings during continuous operation, thereby utilizing more of the machine copper and magnet material.

27 Claims, 6 Drawing Sheets

QUASI SQUARE-WAVE BACK-EMF PERMANENT MAGNET AC MACHINES WITH FIVE OR MORE PHASES

BACKGROUND OF THE INVENTION

1. Field of the invention

The present invention relates to permanent magnet (PM) synchronous machines and, more particularly, to a quasi square-wave brushless DC machine incorporating five or more phases for increased efficiency and/or torque density.

2. Description of the Background

Consider a pole pair of a generic permanent magnet synchronous linear machine as shown in FIG. 1. The direction of rotor movement is along the x-axis, and this is perpendicular to the y-directed magnetic flux flow across air gap 2. The current I through the phase windings of the stator can be represented by an equivalent z-directed sheet current $K_{sz}(x)$ at point 4 because the sheet current $K_{sz}(x)$ produces the same fields as those which would otherwise be produced by actual stator windings. At the position 4 of the equivalent sheet current $K_{sz}(x)$, the tangential (or x-directed) component of surface force density (or stress) $f_z$ is given by:

$$f_z(x) = -K_{sz}(x)B_{my}(x) \quad (N/m^2)$$

where $B_{my}(x)$ is the normal or y-directed component of magnetic flux density through the air gap 2 due to the rotor magnet 6.

The net instantaneous force per pole $F_p$ per unit active width of the machine of FIG. 1 is then given by:

$$F_P = -\int_{-x_p/2}^{x_p/2} K_{sz}(x)B_{my}(x)dx \quad (N/M) \quad (1)$$

, where the distance $x_p$ is a pole pitch.

It is obvious from equation (1) that for maximum motoring (or generating) force per ampere of stator current we must have the stator sheet current $K_{sz}(x)$ and air gap 2 magnetic flux density $B_{my}(x)$ spatially and temporally in phase (anti-phase for generation).

FIG. 2 gives a simple example for a sinusoidally varying stator sheet current $K_{sz}(x)$ which is in-phase with a sinusoidally varying magnetic flux density $B_{my}(x)$ at air gap 2. For peak flux density $B_m$ and peak sheet current density $K_s$, equation (1) can be solved as follows for the net force per pole $F_p$ for the perfectly in-phase drive of FIG. 2:

$$F_p = -K_s B_m x_p/2.$$

It is known that single frequency sinusoidal line voltage and current machines do not fully utilize the available "active" regions at the air gap 2. More specifically, the driving stress at the stator surface peaks at the pole centers when the rotor magnets reach alignment with a stator current sheet, but towards the mid-pole regions of air gap 2, the drive stress falls to zero. Hence, the net force per pole $F_p$ for a perfectly in-phase AC sinusoidal drive is unduly low in comparison to "square-wave" machines.

Permanent magnet synchronous machines which operate from square-wave input signals make better use of the air gap 2 periphery.

FIG. 3 gives an example for a three-phase machine operating from a quasi-square wave (a.k.a. trapezoidal) stator sheet current $K_{sz}(x)$ which is in-phase with a square-wave magnetic flux density $B_{my}(x)$ at air gap 2. For square-wave machines, let the fraction $m_p$ equal that portion of a full pole pitch which, at any one time, has full stator sheet current excitation at maximum value $K_{s\square}$. For the same RMS heating as in the above-described sinusoidal drive and for equal amounts and even distribution of stator copper, the maximum square-wave stator excitation current must relate to the maximum sinusoidal stator excitation current as follows:

$$K_{s\square} = K_s/\sqrt{2m_p}$$

Again solving equation (1) for a square-wave machine with square waves of magnetic flux and current drive, and for peak flux density $B_m$ and peak sheet current density $K_{s\square}$, the net force per pole $F_p$ for a perfectly in-phase drive is $-K_{s\square}B_m m_p x_p$. Thus, with equal $I^2r$ heating losses, the quasi-square wave machine generates a force per pole $F_p$ which exceeds that of an otherwise equivalent sinusoidal AC machine by an improvement factor of $\sqrt{2m_p}$. Since three-phase quasi square-wave (trapezoidal) back emf machines have approximately constant current flow in two of the three stator phase windings at any one time, the fraction of rotor magnet use $m_p$ equals $\frac{2}{3}$, and the above-described improvement factor under ideal conditions equals $\sqrt{4/3}$, or 1.16.

The improvement factor can be elevated even further by constructing a quasi square-wave back emf PM machine with a greater number of phases. For instance, a five phase machine would have 4/5 of the rotor magnets active, and the improvement factor would equal $\sqrt{8/5}$ or 1.27. It should be noted that the incremental gain in the improvement factor falls off rapidly for phase orders exceeding five phases. For example, the improvement factors for 7, 9, and 11 phase machines are 1.31, 1.33, and 1.35, respectively.

Higher phase order square wave PM machines also make better use of the solid-state switching devices in their switched drive systems (relative to their three-phase counter parts). Specifically, if the machine peak stator phase winding current has value $I_m$, and the peak machine line-to-line back emf has value $E_m$, then the required peak volt-amp performance for an n-phase machine is $(n-1)E_m I_m/2$. Moreover, an n-phase machine requires 2n switching devices in the accompanying solid state inverter drive system, and each switch must be capable of blocking at least $E_m$ volts and conducting at least $I_m$ amps. The total volt-amp rating of the inverter is thus $2nE_m I_m$. The ratio of inverter volt-amps to machine volt-amps is then $4n/(n-1)$, which for 3, 5, 7, and 9 phase machines has values of 6, 5, 4.67, and 4.5, respectively. Again, we see better results as the phase order increases, and the largest incremental advantage occurs in the 5-phase machine.

Consequently, it would be greatly advantageous to provide a higher phase-order (five or more) quasi square-wave back emf permanent magnet machine which capitalizes on the above-described efficiencies.

SUMMARY OF THE INVENTION

It is an object of the present invention to provide a higher phase-order (five or more) permanent magnet machine to increase the number of active phase windings during continuous operation, thereby utilizing more of the machine copper and magnet material.

It is another object to increase the efficiency of the above-described machines by employing a quasi square-wave (trapezoidal) drive.

It is a specific object to employ five phase windings in a quasi square-wave back emf PM machine in order to maintain 4 active phases, thereby utilizing 4/5 of the machine copper and magnet material. Likewise, it is an object to employ seven, nine, eleven and more phase windings to respectively maintain 6, 8, 10, etc. active phases, thereby maximizing the use of the machine copper and magnet material.

It is another object to provide a solid state inverter drive circuit for an n-phase quasi square-wave back emf PM machine as described above, said drive circuit requiring only 2n switching devices.

In accordance with the above-described and other objects, the present invention provides a new class of quasi square-wave (trapezoidal) back-emf permanent magnet AC machines with five or more phases. The subject matter of the invention conforms to the following document, said document herein being incorporated by reference: McCleer, *Five Phase Trapezoidal Back EMF PM Synchronous Machines and Drives*, presented at the European Power Conference, Florence, Italy, Sep. 3, 1991.

In particular, the subject matter of the invention includes a rotary permanent magnet synchronous machine which, in a radial embodiment, has a rotor with a cylindrical rotor core and a plurality of permanent magnets spaced at equal angular intervals around the rotor core. The pitch of each permanent magnet defines one rotor pole. The machine also includes a stator and a plurality of stator windings forming n stator phases, where n must be an odd number $\geq 5$. The stator may be formed with a plurality of salient teeth spaced at equal angular intervals around a central axis, and each stator winding is wound around a group of stator teeth to define a stator pole having a pitch substantially equal to the pitch of the rotor poles (permanent magnets). Alternatively, the stator teeth may be omitted, and the stator windings are wound directly within the air gap between the stator and rotor to likewise define stator poles having a pitch substantially equal to the pitch of the rotor poles (permanent magnets).

In an axial embodiment, the invention includes a rotor having a rotor core with a plurality of pie-shaped permanent magnet wedges arranged at equal angular intervals around a central axis to define a disk. The pitch of each permanent magnet defines one rotor pole. The axial embodiment also includes a stator for exciting the rotor to move, the stator being provided with a plurality of stator windings forming n stator phases, where n is an odd number $\geq 5$. The stator includes at least one stator disk facing the rotor, and depending on the particular application, a pair of stator disks may be provided on opposing sides of the rotor. Each stator disk may be formed with a plurality of salient teeth extending radially along the disk and projecting inwardly toward the rotor. This way, the stator windings are each wound around a group of the stator teeth to define a stator pole having a pitch substantially equal to the pitch of the rotor permanent magnets. Alternatively, the stator teeth may be omitted, and the stator windings wound directly within the air gap between the stator and rotor to likewise define stator poles having a pitch substantially equal to the pitch of the rotor poles (permanent magnets).

Further, a linear embodiment of the invention is disclosed which includes a secondary having a linear secondary core, and a plurality of permanent magnets spaced at equal intervals along a surface of the secondary core. The pitch of each permanent magnet defines one secondary pole. A primary is also provided for exciting the secondary to move. The primary further comprises a linear primary core having a plurality of primary windings forming n primary phases, where n is an odd number $\geq 5$. The primary may be formed with a plurality of salient teeth spaced at equal angular intervals along a surface thereof and facing the secondary permanent magnets. This way, the primary windings are each wound around a group of primary teeth to define a primary pole having a pitch substantially equal to the pitch of the secondary permanent magnets. Alternatively, the stator teeth may be omitted, and the stator windings wound directly within the air gap between the stator and rotor to likewise define stator poles having a pitch substantially equal to the pitch of the rotor poles (permanent magnets).

In any of the rotary (axial or radial) or linear embodiments, the number n of stator phases may be 5, 7, 9 . . . etc.

The invention also provides a switched voltage source inverter drive circuit and commutation sequence for commutating any of the rotary or linear embodiments. The drive circuit includes 2n gated switch devices arranged in n parallely-connected switch legs for connection to an input voltage source. Each switch leg has an upper switch device coupled to one of the motor phase windings for driving the phase winding according to a first polarity, and a lower switch device coupled to the one motor phase winding for driving said phase winding according to a second polarity. The switch devices of the drive circuit are gated according to a predetermined commutation sequence at angular intervals of $((n-1) \times 180°)/n$.

BRIEF DESCRIPTION OF THE DRAWINGS.

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENTS

Figure 1:
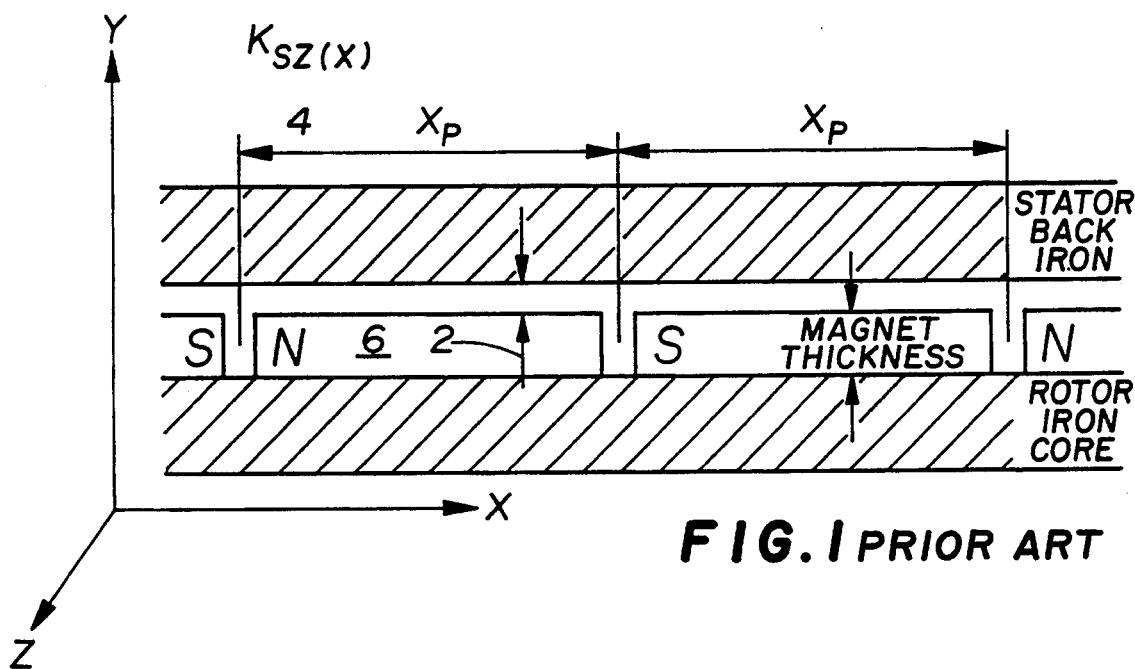
FIG. 1 is a cross-section of generic permanent magnet synchronous machine pole pair which, for illustrative purposes, is shown in linear form.
Figure 2:
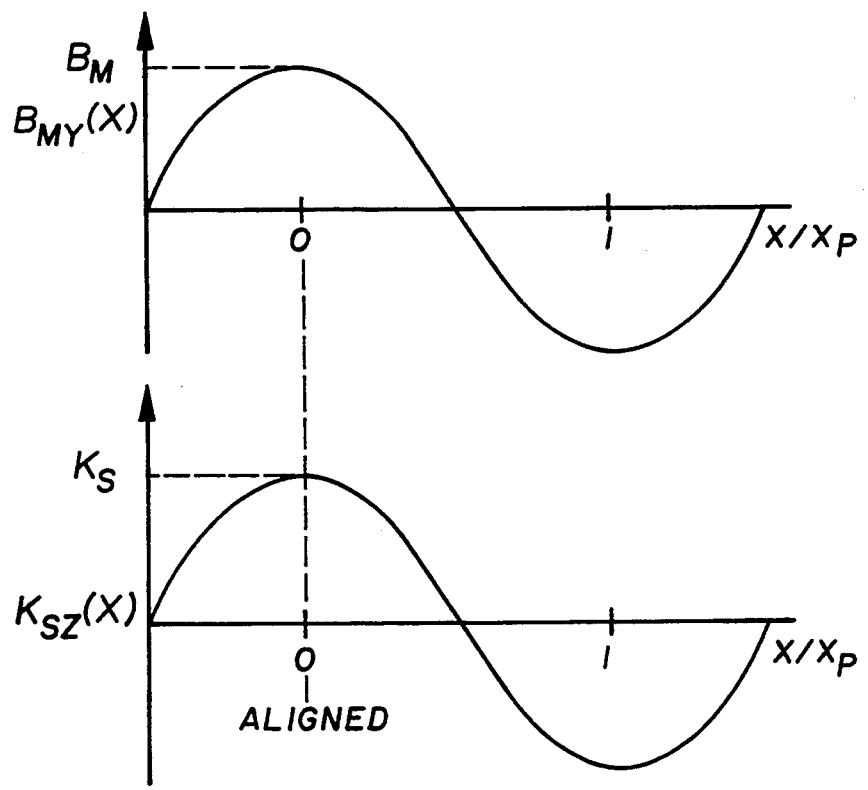
FIG. 2 is a graphical illustration of a sinusoidally varying AC stator sheet current $K_{sz}(x)$ for the machine of FIG. 1, along with a graph of sinusoidally varying in-phase magnetic flux density $B_{my}(x)$ across air gap 2.
Figure 3:
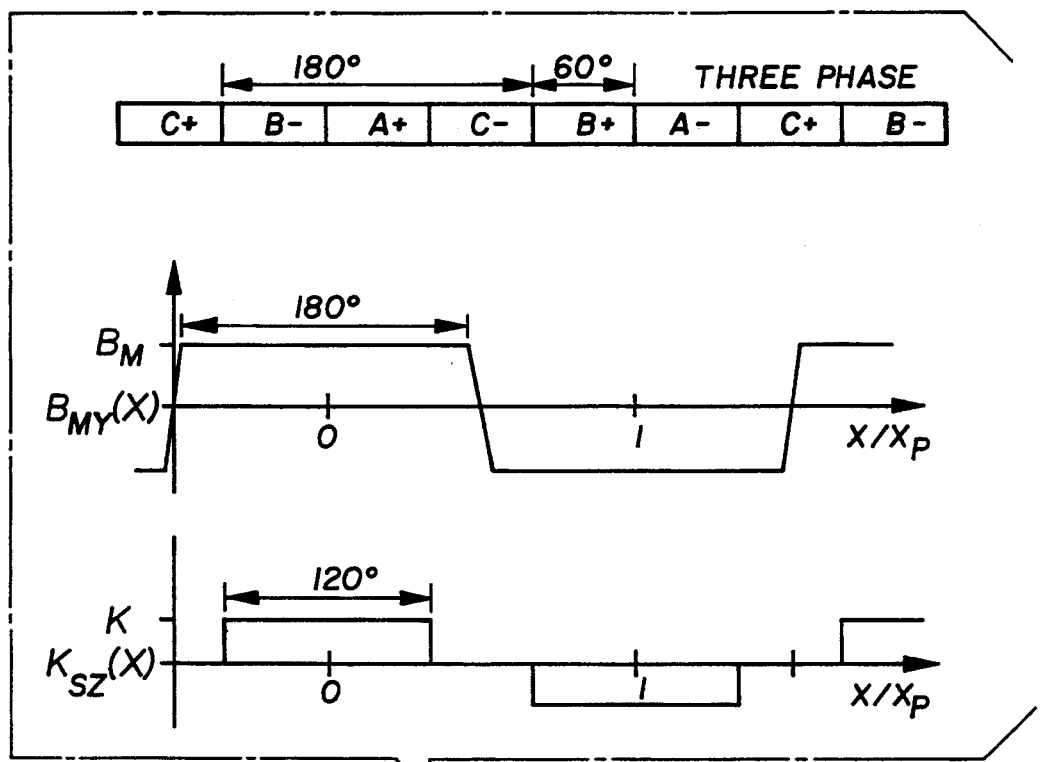
FIG. 3 is a graphical perspective for a three-phase machine operating from a quasi-square wave stator sheet current $K_{sz}(x)$ as shown in the lower graph, said current being in phase with the air gap 2 magnetic flux density $B_{my}(x)$ shown in the middle graph.
Figure 4:
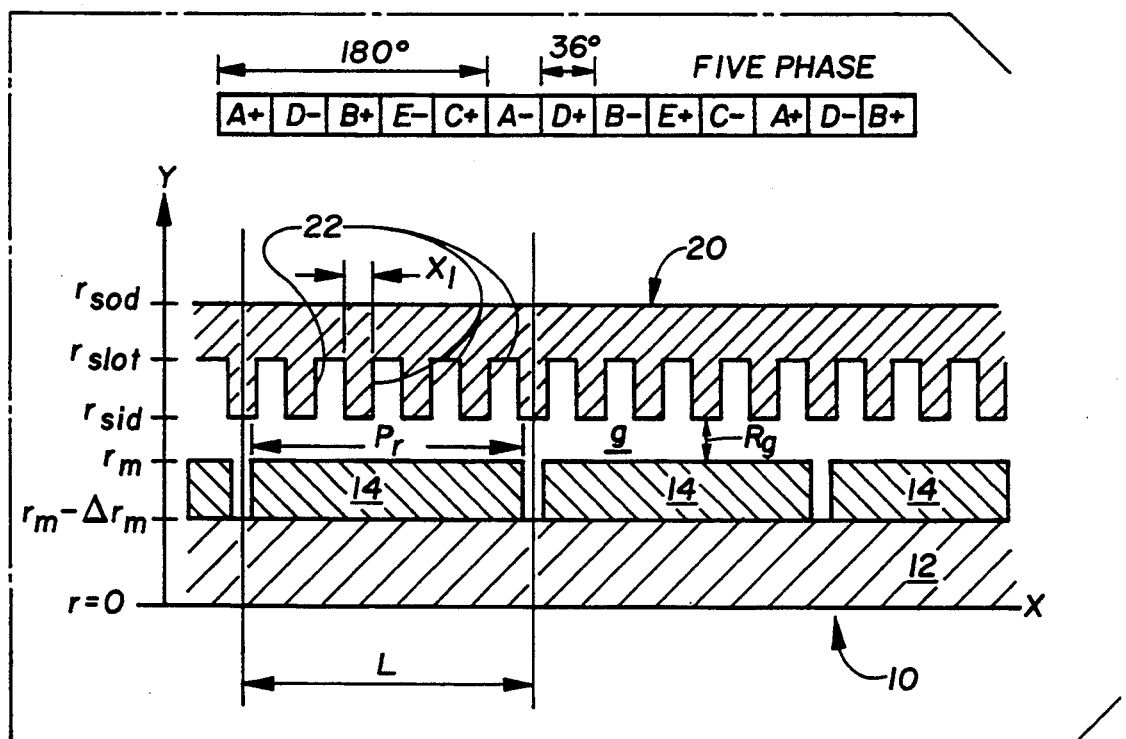
FIG. 4 illustrates a cross-section of a quasi square-wave back-emf permanent magnet machine having five phases in accordance with one embodiment of the present invention, the section being shown in linear form for ease of illustration.

FIG. 4 illustrates a linearized section of a quasi square-wave (a.k.a. trapezoidal) back-emf permanent magnet machine having five phases in accordance with one embodiment of the present invention. An exemplary five-phase stator winding distribution is shown above for perspective. Although the illustration of FIG. 4 extends linearly in the x-direction, this is merely to better describe dimensions along the y-axis. Hence, FIG. 4 may be used to explain linear embodiments of the invention (having a primary and secondary) as well as both radial and axial rotary embodiments (having stators and rotors).

The machine includes a secondary (or rotor) 10 having a core 12 and a plurality of permanent magnets 14 mounted along the surface in a facing relation to a primary (or stator) 20.

The secondary (rotor) core 12 and primary (stator) core 20 are formed in a conventional manner from a plurality of discrete laminations which are stacked along a length L. The primary (stator) 20 laminations are slotted to define a plurality of salient teeth 22 opposing permanent magnets 14, and the faces of teeth 22 are separated from the faces of magnets 14 by an air gap g of extent $R_g$. The phase windings are situated in the slots between stator teeth 22. The effect of the relative dimensions of the slots and the extent $R_g$ of air gap g on the strength of the magnetic flux $B_{my}(x)$ within the air gap g may be calculated in a conventional manner such as shown and described in M. G. Say, *Alternating Current Machines*, Halsted Press, John Wiley & Sons, New York, pp. 37–39 (5th Ed., 1983).

It should be apparent to those skilled in the art that the stator teeth 22 can be eliminated if the permanent magnets 14 are strong enough, and the phase windings can be situated in the air gap g itself if the application so permits. Such a variation is considered to be within the scope of the invention.

A radial air-gap embodiment of the invention will now be described with reference to FIG. 4. The permanent magnets 14 of the rotor 10 are uniform, have full pole pitches $p_r$, and a constant thickness $\Delta r_m$ and are uniformly magnetized in the y (or radial) direction. The permanent secondary (rotor) magnets 14 may also be formed from a plurality of stacked laminations, and permanent magnets 14 likewise have an axial extent L. Torque production is considered to be uniform along the stack length L of the radial machine.

In accordance with elementary electromagnetic theory, we will view the radial rotary embodiment under the following two assumptions:

(1) The torque $T_e$ on the stator 20 due to a single stator conductor carrying current I, when said conductor is positioned in a slot directly over a rotor magnet 14, and the rotor magnet 14 produces a y-directed (or radial) component of magnetic flux density $B_{sr}$ at the effective inside distance $r_{sid}$ of the stator laminations 20, is given by the following equation:

$$T_e = r_{sid} \times B_{sr} \times I \times L;$$

In a rotary embodiment, $r_{sid}$ is the actual inside radius of the stator laminations.

(2) A voltage $e_e$ which is induced in a single stator conductor as described in (1) above, and which is subject to the y-directed (or radial) component of magnetic flux density $B_{sr}$ at the effective inside distance $r_{sid}$ of the stator laminations 20 and which is rotating at angular velocity $\omega_m$ is given by the equation:

$$e_e = B_{sr} \times L \times r_{sid} = \omega_m.$$

It is important to note that the torque $T_e$ and voltage $e_e$ of relations (1) and (2) remain at their peak values over approximately the full pitch a permanent magnet 14. In contrast, the torque $T_e$ and voltage $e_e$ of relations (1) and (2) are at their peak values for only a single instance (the center of a magnetic pole) for a sinusoidal machine.

Taking relations (1) and (2) in the context of the above-described general structure of the rotary machine, the remaining detailed machine design requires devising a magnetic field excitation structure, a set of stator windings, and the connections of said stator windings which will produce the required total torque and total winding voltage needed to satisfy a given set of predetermined specifications.

The specifications which must be provided to begin the detailed design are as follows: 1. $P_R$, rated machine shaft power. 2. $\omega_R$, rated machine shaft speed, the lowest speed at which the machine is to attain its rated power. 3. $r_{sod}$, outside radius of stator laminations. 4. $r_m$, outside radius of rotor magnet segments. 5. $\Delta r_m$, radial thickness of rotor magnet segments. 6. $B_{rm}$, residual magnetic flux density of the rotor PM material. 7. $\mu_m$, relative magnetic permeability of rotor PM material. 8. g, air gap length. 9. L, active axial length of machine. 10. $N_\phi$, number of phases in stator windings. 11. $N_p$, number of magnetic poles. 12. $N_{pcs}$, number of parallel coil sets per phase in stator windings. 13. $N_{pwc}$, number of parallel wires which form "one" conductor. 14. $N_c$, the number of conductors per slot (equal to two times the number of turns per coil in any one full pitch coil). 15. AWG, the type (AWG number) of wire used in the stator windings. 16. $R_w$, resistance at a given temperature per unit length of the wire used in the stator windings. 17. $N_w$, number of wires which can be packed (wound) in a unit cross-sectional area. 18. $t_i$, thickness of slot insulation material. 19. $S_j$, slot fill factor, the fraction of available slot cross-sectional area to be "filled" with wire at the density $N_w$.

We can derive the total torque T for a square-wave input by adding the total torque contributions from all of the stator conductors as determined in relation (1), as follows:

$$T = \sqrt{2m_p} \; R_g N_p L K_s B_m \frac{x_p}{2}$$

where $R_g$ is the radius of the air gap and $N_p$ is the number of magnetic poles.

Since we also know that $N_p x_p \; 2\pi R_g$ (where $R_g$ is the approximate diameter of the air gap g region), the expression for total torque becomes:

$$T = \sqrt{2m_p} \times \pi R_g^2 L \times K_s B_m \tag{3}$$

Note that the middle term is the air gap enclosed volume which depends upon the radius of the air gap $R_g$. This can be rearranged in terms of the air gap diameter $D_g$ to give:

$$L = \left[ \frac{4T}{\pi \sqrt{2m_p} \; (D_g/L)^2 K_s B_m} \right] \tag{4}$$

Knowing that the machine will have five phases, we know that the fraction of rotor magnet 6 use $m_p$ equals 4/5. In addition, the choice of permanent magnet 14 material determines the peak flux density $B_m$. Hence, given an initial choice of permanent magnet material, and setting $D_g/L$ to 1 to minimize potential dynamic problems such as hoop stress at high speeds and low critical speeds, we can now calculate the length L of the machine using equation (4) above for a given peak value of sheet current density $K_s$.

As one example of a radial rotary embodiment according to the present invention, we will consider a 10 horsepower five-phase machine which employs inexpensive conventional ceramic permanent magnets 14 which are to be fabricated with ceramic material equivalent to commercially available Hitachi$^R$ grade YBM-2BB, with a $B_{rm}=0.42$ Tesla, and a relative permeability of $\mu m=1.05$. The base/rated speed of the machine is specified to be 3600 rpm, and the switched drive system is powered from a full wave, 6-pulse diode bridge rectifier connected to a 240 volt three phase input main.

At the rated 3600 rpm speed, the machine line-to-line back emf must be slightly lower than the DC-bus voltage (approximately 339V for a 240V system).

The detailed machine dimensions of the above-described 10 horsepower five-phase radial rotary embodiment may be determined using equation (4) above, with $T = T_R = P_R/\omega_R = 20.2 \; N-m$ $D_g/L = 1.0$ $\sqrt{2m_p} = 1.27$ $K_s = 20,000 \; A/m$ and $B_m = 0.75 B_{rm}$, where it is assumed that we can attain at least 75% of the residual induction of the magnet in the air gap and a relatively low $K_s$ compared to standard AC machinery in order to lessen $i^2R$ losses.

Evaluation of equation (4) with the above-specified parameters yields length $L=D_g=148$ mm-6 inches.

Further consideration of standard commercially available rotary frames approximating such dimensions leads to an initial choice of the National Electrical Manufacturer's Association (NEMA) standard 182T frame, which has a total outer diameter (including small fins) of 9.0 inches. We can estimate a stator 20 lamination outside radius at 4.25 inches.

The choice of pole order for the machine results in a trade-off between operation at a lower electrical frequency (hence, lower magnetic losses) for low pole order machines versus a reduced radial thickness of the primary (or stator) 20 for higher pole order machines.

All remaining design parameters may be easily determined by common and conventional design principles, or by trial and error.

The following Table 1 sets forth a completed design for the 10 hp radial rotary machine.

TABLE 1

| Computed Data: | | |
| --- | --- | --- |
| Rated Torque | 20.17 (N-m) | |
| r stator id | 3.03 (inch) | 79.96 (mm) |
| Tooth arc width | 12.09 (mm) | |
| $B_\Gamma$ stator | 0.345 (Tesla) | |
| $B_\Gamma$ tooth | 0.864 (Tesla) | |
| r slot | 86.69 (mm) | 3.41 (inch) |
| $B_{max}$ stator yoke | 0.982 (Tesla) | |
| Rated phase current | 13.05 (A) | |
| Back-emf at rated speed | 292.24 (V) | |
| $R_s$ phase | 258.36 (mOhm) | |
| $L_s$ phase (self inductance) | 0.111 (mH) | |
| Teeth loss at rated speed | 57.53 (W) | |
| Stator yoke loss at rated speed | 103.87 (W) | |
| Efficiency at rated speed and torque | 95.67 (%) | |

The calculated performance results given in Table 1 are very encouraging; assuming worst case, an efficiency of greater than 95% may be expected at rated output conditions. The efficiency values are most impressive over a range of torque and speed below machine ratings.

Figure 5:
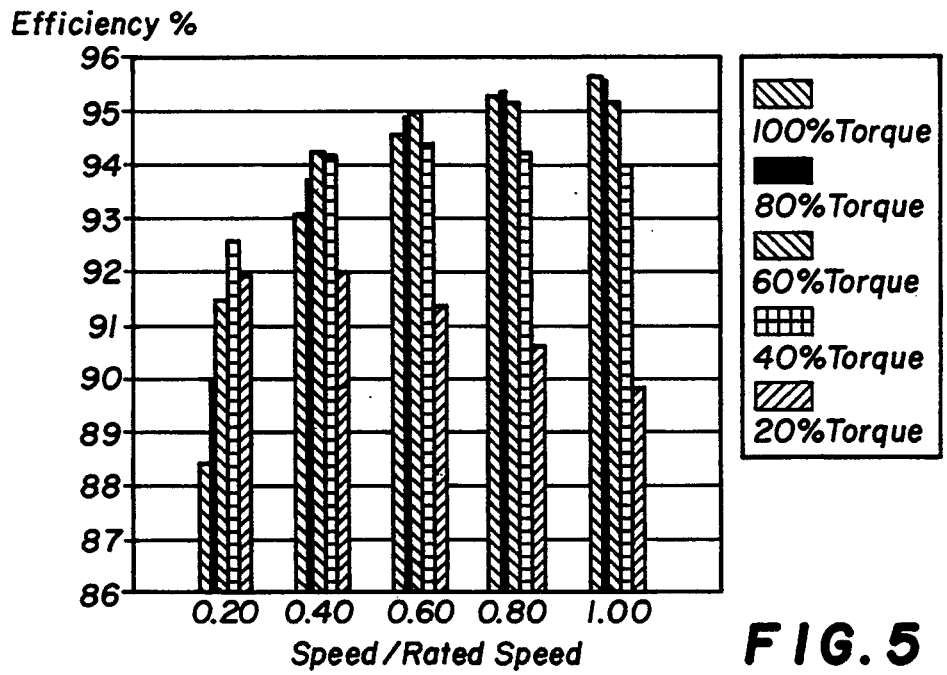
FIG. 5 is a bar graph illustrating the calculated efficiency of the above-described 10 hp embodiment as a function of both the percentage of rated speed and the percentage of rated torque.

FIG. 5 is a bar graph illustrating the calculated efficiency of the above-described 10hp embodiment as a function of both the percentage of rated speed and the percentage of rated torque. Note that these predicted efficiency values do not include the effects of any high frequency loss components due to continuous pulse width modulation (PWM) control of the machine current by a PWM switched drive system. The magnetic losses quoted here are calculated by the method set forth in Slemon et al., "Core Losses in Permanent Magnet Motors", IEEE Transactions on Magnetics, Vol. 26, No. 5, pp. 1653–1655 (Sep., 1990).

The variation of the radial component of gap flux density $B_{sr}$ at the effective inside distance $r_{sid}$ of the stator laminations 20 is shown in FIG. 6 (as determined by the analytic method set forth in Boules, "Prediction of No-load Flux Density Distribution in Permanent Magnet Machines" IEEE Transactions on Industry Applications, Vol. IA-21, No. 3, pp. 633–645 (May/Jun.

1985)). FIG. 6 is broken into four graphs covering four possible magnet angular widths $a_m$ of permanent magnets 14.

Figure 6A:
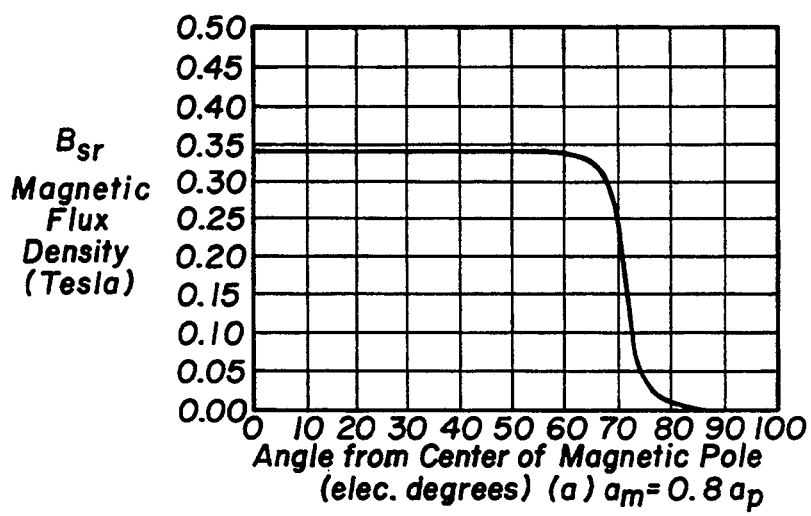
FIG. 6 is a graphical illustration showing the variation of the radial component of gap flux density $B_{sr}$ at the effective inside distance $r_{sid}$ of the stator laminations 20 of FIG. 1, the illustration being broken into four graphs covering four possible magnet angular widths $a_m$ of permanent magnets 14.
Figure 6B:
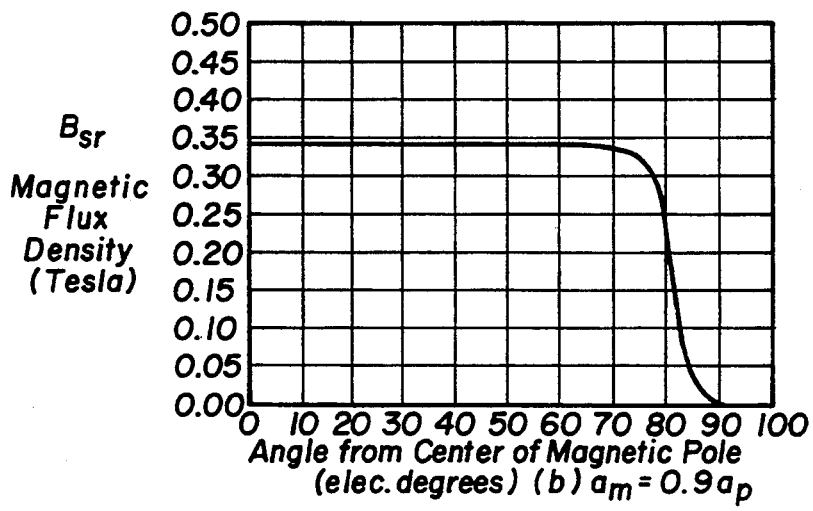
Figure 6C:
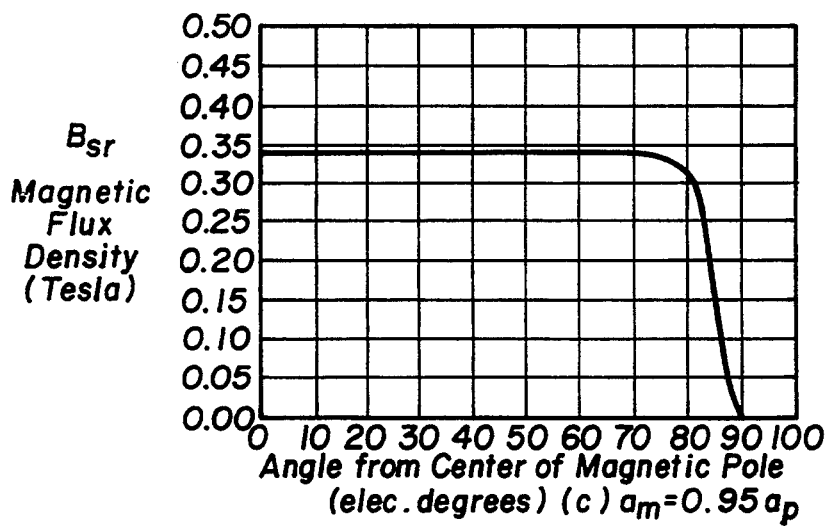
Figure 6D:
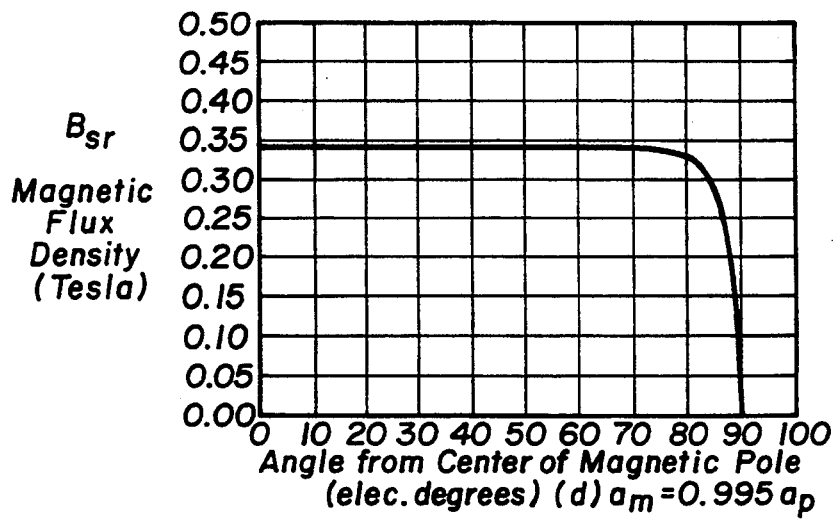

FIG. 6(c) illustrates a nominal design case wherein $a_m=95\%$ of a full pole pitch. In this case, the magnetic flux density $B_{sr}$ is almost constant at its peak value over 7/9 of a pole arc, and falls to approximately 94% of its peak value at an angle of 80 electrical degrees off pole center. Since the concentrated phase windings within one slot extend an angle of approximately 17 electrical degrees (given uniform slots and stator teeth 22, the waveform of the back emf will nearly match the flux density $B_{sr}$ waveform of FIG. 6(c). The drop-off of the back emf waveform may be somewhat more rounded due to the randomness of the windings within any one slot. However, this is insignificant since nearly all of the radial flux $B_{sr}$ through the gap g will be occur through the stator teeth 22, and this tends to lessen the effect of the current within a slot.

Experimental results for the three phase quasi square-wave (trapezoidal) PM synchronous machine according to the present invention confirm that the actual back emf waveforms have sharper corners than would be expected if only averaging over a slot arc was considered.

The above-described description has been limited to a rotary embodiment of the invention having a radial air gap. However, those skilled in the art would consider the counterpart axial air gap rotary embodiment to be equivalent in all material respects and clearly within the scope of the invention.

Figure 7:
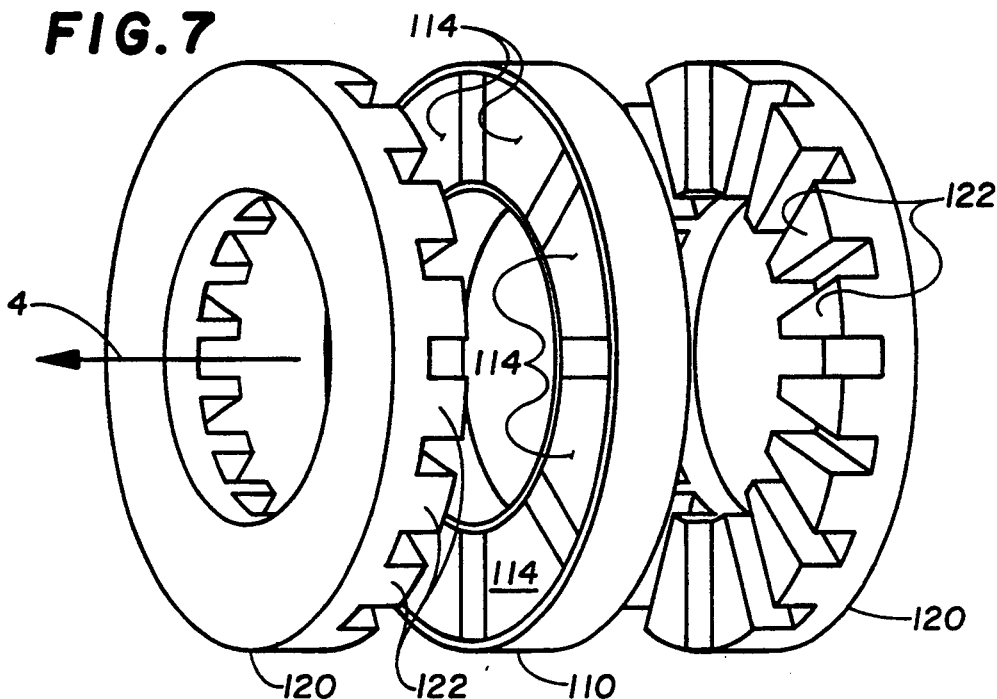
FIG. 7 is a perspective drawing showing an axial rotary PM synchronous machine according to a second embodiment of the present invention.

FIG. 7 is a perspective drawing of an axial embodiment of a PM synchronous machine according to the present invention. The illustrated axial embodiment includes two diametric stator disks 120 each having a plurality of salient pie-shaped wedge teeth 122 projecting inwardly toward an interposed cylindrical rotor 110. However, it should be apparent that an axial machine could be constructed in accordance with the present invention using only one of the two stator disks 120. The cylindrical rotor 110 is formed from a plurality of pie-shaped wedge permanent magnets 114 which are equally spaced and-alternately arranged by polarity around a central axis of the machine. The relation between each stator disk 120 and the rotor 110 of the embodiment of FIG. 7 is essentially similar to the above-described radial embodiment, and can likewise be explained with reference to FIG. 4. Permanent magnets 114 of the rotor 110 are uniform, have full pole pitches $P_r$, are wedge-shaped, and are uniformly magnetized in the y (or axial) direction along the radial extent L. The foregoing design calculations and performance evaluations for the radial embodiment would be exactly the same for an axial embodiment (having an axial air gap g) if one redefines the axial dimensions (in the z-direction) of FIG. 4 as radial and the radial dimensions (in the y-direction, including variables $r_m$, $r_{sid}$, $r_{slot}$ and $r_{sod}$ of FIG. 4) as axial dimensions which are constant along a circular cut of constant radius from the center axis of the machine. In this perspective, the circumferentially-directed surface force density (or stress) f becomes the product of a radial sheet current density K and an axial flux density B.

In addition, one must further impose the equivalence $R_g=(r_{soa}-r_{sia})/2$, e.g., the equivalent air gap radius $R_g$ being equal to the average radius for the stator conductors, where $r_{sos}$ is the outside axial dimension of the stator conductors and $r_{si}$ is the inside axial dimension.

The "length" of the stator conductors $r_{soa}-r_{sia}$ is then equivalent to the axial length L in the radial gap equations.

The following table 2 shows the design results for an axial air gap 6-pole, five phase, 10 hp, 3600 rpm machine which utilizes rare earth (SmCo) wedge-shaped permanent magnets 114 and concentrated, full pitch stator windings to obtain quasi square-wave (trapezoidal) back emf waveforms.

TABLE 2

| Parameters | Five Phase |
|---|---|
| Stator $r_{soa}$ | 10" |
| Stator $r_{sia}$ | 6" |
| Winding Av. radius | 4" |
| Poles | 6 |
| Rated Speed | 3600 rpm |
| Slots | 30 |
| Inside radius | 0.5878"/0.25" |
| Tooth/slot width | |
| Permanent | SmCo |
| Magnetic Material | 1.0 T |
| Peak Flux Density | 12.5 A |
| Winding Current | 15 ft lb |
| Rated Torque | 18 |
| Turns/coil | |
| Coil Connections series/parallel | 6/1 |

In addition to both axial and radial embodiments of the rotary machine, those skilled in the art would consider the counterpart linear embodiment to be equivalent in all material respects and also within the scope of the invention.

Figure 8:
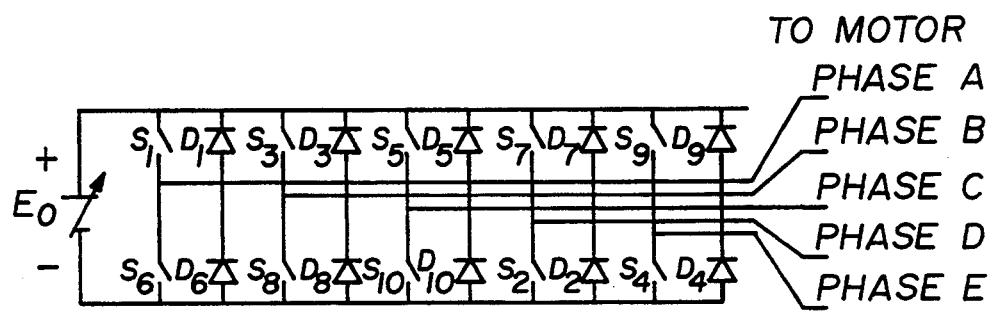
FIG. 8 is a schematic diagram of a voltage source inverter (VSI) drive circuit for use in driving a five phase quasi square-wave back emf machine according to the present invention.

FIG. 8 illustrates a basic voltage source inverter (VSI) drive circuit for a five-phase quasi square-wave back emf machine according to the present invention which utilizes ten (10) active switch devices $S_1$–$S_{10}$.

Switch devices $S_1$–$S_{10}$ may be any suitable gated solid-state switching elements such as bi-polar transistors, insulated-gate bi-polar transistors, field effect transistors, or gate turn-off thyristors.

Ten wheeling diodes $D_1$–$D_{10}$ provide conduction paths for phase winding (inductive) currents whenever a corresponding switch device $S_1$–$S_{10}$ on the same inverter leg is gated off.

Figure 9:
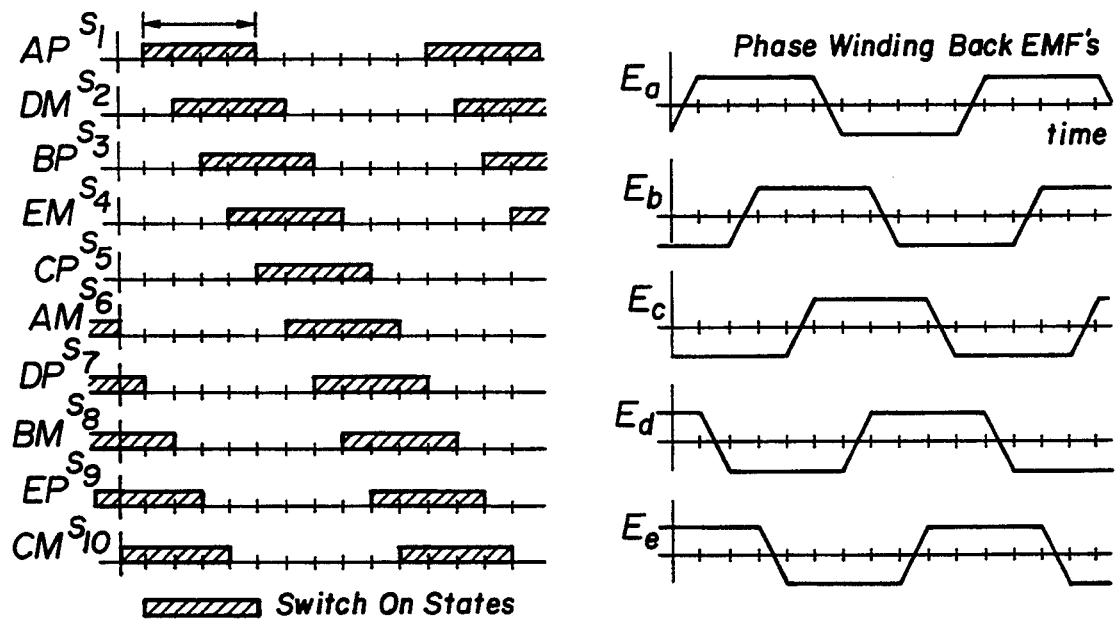
FIG. 9 is a side-by-side graphical illustration of a suitable switching sequence for switch devices $S_1$–$S_{10}$ of FIG. 7 and the corresponding quasi square-wave back emfs for each of the five phase windings.

Switch devices $S_1$–$S_{10}$ are sequentially gated according to the switching sequence shown in FIG. 9. Switching occurs in 144 electrical degree periods which are synchronized to the stator winding back emfs of the rotor (or secondary) magnets 6, i.e., in synchronism with the secondary (or rotor) position. For the illustrated 144° square wave drive, the DC source voltage $E_o$ must be varied with machine speed to maintain control of the magnitude of the stator winding currents. Alternatively, $E_o$ can be fixed and within the correct (144°) periods (as determined by rotor position), the switching devices $S_1$–$S_{10}$ can be gated in a conventional pulse width modulated (PWM) mode to attain current control.

Figure 10:
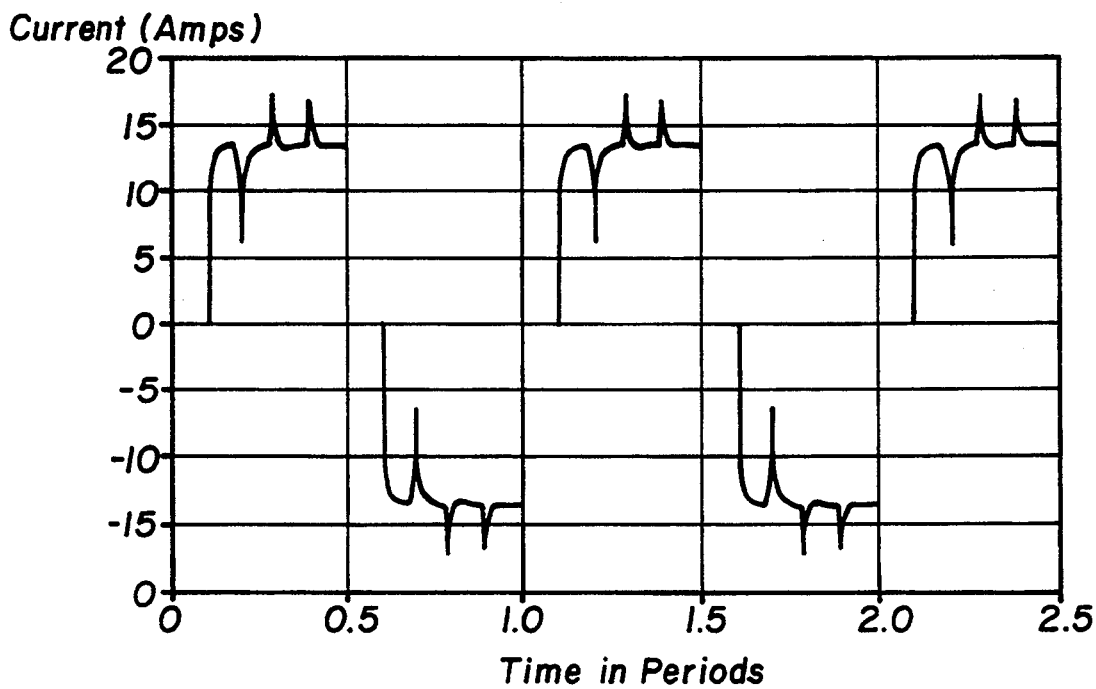
FIG. 10 is a graph of a simulated waveshape of the terminal current in any one of the five phases for the 144° square wave drive of FIG. 8 applied to a 10 hp rotary embodiment of the invention.
Figure 11:
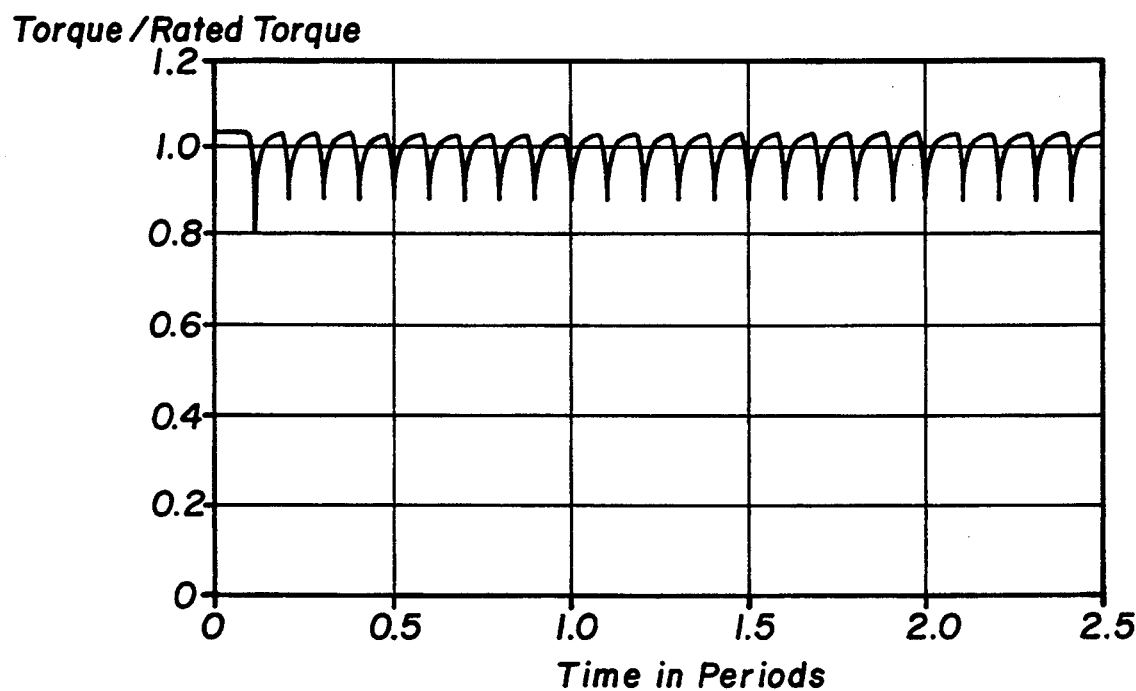
FIG. 11 is a graph of the simulated instantaneous variation of drive torque (torque ripple) in the 10 hp rotary embodiment due to all the winding currents when the machine is driven at 38.6% of its rated speed (1390 rpm) and the terminal current is maintained at 13.4 A.

Simulation results for the above-described 144° square wave drive applied to the 10 hp rotary embodiment described above are given in FIGS. 10 and 11. FIG. 10 shows the waveshape of the terminal current in any one phase and FIG. 11 shows the instantaneous variation of the drive torque due to all the winding currents. The machine is being driven at 38.6% of its rated speed (1390 rpm), and the DC drive voltage $E_o$ is such that the flat top value of the terminal current is 13.4 A (103% of the design rated value). The fast rise of fall spike-like deviations in the terminal current and thus the notch-like deviations in the drive torque are due to commutation transients in the incoming and outgoing phase at switch device/phase switching points. Current in the outgoing (turned-off) phase falls rapidly, being driven to zero by back emf voltages approximately to $E_o$. However, current in the incoming phase is driven to its flat top value by only the small difference between $E_o$ and the sum of two back emf voltages. Current in each phase is affected due to the common connection at the isolated neutral point and the mutual inductances between the stator windings. Since the secondary (or rotor) magnets have approximately air-like values of relative permeability ($\mu m \simeq 1$) and are mounted on the (round) secondary (or rotor) surface, the mutual inductances between the stator windings are not functions of the secondary (or rotor) instantaneous position. For the concentrated winding five phase machine, the inductance matrix representing the self and mutual inductances of the five stator windings can be easily shown to be:

$$\frac{L_s}{5} \begin{bmatrix} 5 & 1 & -3 & -3 & 1 \\ 1 & 5 & 1 & -3 & -3 \\ -3 & 1 & 5 & 1 & -3 \\ -3 & -3 & 1 & 5 & 1 \\ 1 & -3 & -3 & 1 & 5 \end{bmatrix}$$

where $L_s$ is the self inductance of any one stator winding.

For applications requiring smooth drive torque, such as machine tools, the torque ripple produced by the simple 144° square wave drive is unacceptable. The torque ripple shown in FIG. 11, approximately 15%, is typical for five phase machines at rated torque output. This ripple value will decrease somewhat at very low speeds and increase somewhat at speeds close to the rated value. There are several known strategies for PWM control of the switching devices during the commutation periods which may be employed to mitigate the magnitude of the torque ripple component.

The above-described results show that five-phase (or more) versions of quasi square-wave back emf PM synchronous machines can better utilize given amounts of machine copper and iron and drive silicon. A potential 27% improvement may be realized in torque/volume performance of a five phase quasi square-wave back emf machine according to the present invention relative to a similarly sized prior art sinusoidal machine.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A permanent magnet synchronous drive system comprising:
    a permanent magnet back emf radial air gap quasi square-wave motor, said motor further comprising,
    a rotor having a cylindrical rotor core, and a plurality of permanent magnets spaced at equal angular intervals around the periphery of said rotor core, a pitch of each of said permanent magnets defining one rotor pole, and
    a stator for exciting said rotor to move, said stator including a stator core and a plurality of stator windings forming N stator phases, N being an odd number $\geq 5$, said stator windings each being wound around said stator core to define a plurality of stator poles each having a pitch substantially equal to a pitch of said rotor permanent magnets; and
    a switched voltage source inverter drive circuit for commutating said phases of said stator according to a predetermined commutation sequence, said drive circuit further comprising 2N gated switch devices arranged in N parallely-connected switch legs for connection to an input voltage source, each switch leg having an upper switch device coupled to one of said motor phase windings for driving said phase winding according to a first polarity, and a lower switch device coupled to the one motor phase winding for driving said phase winding according to a second polarity.

2. The permanent magnet synchronous drive system according to claim 1, wherein said number N equals 5.

3. The permanent magnet synchronous drive system according to claim 1, wherein said number N equals 7.

4. The permanent magnet synchronous drive system according to claim 1, wherein said number N equals 9.

5. The permanent magnet synchronous drive system according to claim 2, wherein each of said switch devices of said drive circuit are gated on for an angular intervals of $((N-1)\times 180°)/N$ during said predetermined commutation sequence.

6. The permanent magnet synchronous drive system according to claim 2, wherein each of said switch devices of said drive circuit are gated in a regulated switching pattern for angular intervals of $((N-1)\times 180°)/N$ during said predetermined commutation sequence.

7. The permanent magnet synchronous drive system according to claim 6, wherein said regulated switching pattern is for pulse width modulation (PWM).

8. The permanent magnet synchronous machine according to claim 2, wherein said stator core further comprises a plurality of salient teeth spaced at equal angular intervals around a central axis, said stator windings each being wound around a group of said stator teeth to define a stator pole having a pitch substantially equal to a pitch of said rotor permanent magnets.

9. The permanent magnet synchronous machine according to claim 2, wherein said stator windings are each wound within an air gap formed between said stator and said rotor.

10. A permanent magnet synchronous drive system comprising:
    a permanent magnet axial air gap synchronous machine including,
    a rotor having a rotor core formed of a plurality of pie-shaped permanent magnet wedges arranged at equal angular intervals around a central axis to define a disk, a pitch of each of said permanent magnets defining one rotor pole, and a stator for exciting said rotor to move, said stator further comprising at least one stator disk concentrically facing said rotor and a plurality of stator windings wound around each stator disk to form N stator phases, N being an odd number $\geq 5$, and said stator windings being wound around each stator disk to define stator poles having a pitch substantially equal to a pitch of said rotor permanent magnets; and a switched voltage source inverter drive circuit for commutating said phases of said stator according to a predetermined commutation sequence, said drive circuit further comprising 2N gated switch devices arranged in N parallely-connected switch legs for connection to an input voltage source, each switch leg having an upper switch device coupled to one of said motor phase windings for driving said phase winding according to a first polarity, and a lower switch device coupled to the one motor phase winding for driving said phase winding according to a second polarity.

11. The permanent magnet synchronous drive system according to claim 10, wherein said number N equals 5.

12. The permanent magnet synchronous drive system according to claim 10, wherein said number N equals 7.

13. The permanent magnet synchronous drive system according to claim 10, wherein said number N equals 9.

14. The permanent magnet synchronous drive system according to claim 11, wherein each of said switch devices of said drive circuit are gated on for an angular intervals of $((N-1) \times 180°)/N$ during said predetermined commutation sequence.

15. The permanent magnet synchronous drive system according to claim 11, wherein each of said switch devices of said drive circuit are gated in a regulated switching pattern for angular intervals of $((N-1) \times 180°)/N$ during said predetermined commutation sequence.

16. The permanent magnet synchronous drive system according to claim 15, wherein said regulated switching pattern is for pulse width modulation (PWM).

17. The permanent magnet synchronous machine according to claim 11, wherein each stator disk further comprises a plurality of salient teeth extending radially along said stator disk and projecting inwardly toward said rotor, said stator windings each being wound around a group of said stator disk teeth to define a stator pole having a pitch substantially equal to a pitch of said rotor permanent magnets.

18. The permanent magnet synchronous machine according to claim 11, wherein said stator windings are wound around each stator disk within an air gap formed between said stator disk and said rotor.

19. A linear permanent magnet synchronous drive system, comprising:

a secondary, said secondary further comprising,
a linear secondary core, and
a plurality of permanent magnets spaced at equal intervals along a surface of said secondary core, a pitch of each of said permanent magnets defining one secondary pole;

a primary for exciting said secondary to move, said primary further comprising,
a linear primary core, and
a plurality of primary windings forming N primary phases, N being an odd number $\geq 5$, said primary windings each being wound around said primary core to define a plurality of primary poles each having a pitch substantially equal to a pitch of said secondary permanent magnets; and a switched voltage source inverter drive circuit for commutating said phases of said primary according to a predetermined commutation sequence, said drive circuit further comprising 2N gated switch devices arranged in N parallely-connected switch legs for connection to an input voltage source, each switch leg having an upper switch device coupled to one of said motor phase windings for driving said phase winding according to a first polarity, and a lower switch device coupled to the one motor phase winding for driving said phase winding according to a second polarity.

20. The permanent magnet synchronous drive system according to claim 19, wherein said number N equals 5.

21. The permanent magnet synchronous drive system according to claim 19, wherein said number N equals 7.

22. The permanent magnet synchronous drive system according to claim 19, wherein said number N equals 9.

23. The permanent magnet synchronous drive system according to claim 20, wherein each of said switch devices of said drive circuit are gated on for an angular intervals of $((N-1) \times 180°)/N$ during said predetermined commutation sequence.

24. The permanent magnet synchronous drive system according to claim 20, wherein each of said switch devices of said drive circuit are gated in a regulated switching pattern for angular intervals of $((N-1) \times 180°)/N$ during said predetermined commutation sequence.

25. The permanent magnet synchronous drive system according to claim 24, wherein said regulated switching pattern is for pulse width modulation (PWM).

26. The permanent magnet synchronous machine according to claim 19, wherein each stator disk further comprises a plurality of salient teeth extending radially along said stator disk and projecting inwardly toward said rotor, said stator windings each being wound around a group of said stator disk teeth to define a stator pole having a pitch substantially equal to a pitch of said rotor permanent magnets.

27. The permanent magnet synchronous machine according to claim 19, wherein said stator windings are wound around each stator disk within an air gap formed between said stator disk and said rotor.

* * * * *